United States Patent [19]

du Quesne

[11] Patent Number: 4,896,712

[45] Date of Patent: Jan. 30, 1990

[54] APPARATUS FOR FITTING TIRES ON THE WHEELS OF MOTOR VEHICLES

[76] Inventor: Francis du Quesne, Kleistraat 138, 2630 Aartselaar, Belgium

[21] Appl. No.: 340,643

[22] Filed: Apr. 20, 1989

[30] Foreign Application Priority Data

Apr. 20, 1988 [BE] Belgium ............................ 8800453
Mar. 30, 1989 [BE] Belgium ............................ 8900353

[51] Int. Cl.$^4$ ............................................ B60C 25/06
[52] U.S. Cl. ...................................... 157/1.24; 157/14
[58] Field of Search ...................... 157/1.22, 1.24, 14, 157/21

[56] References Cited

U.S. PATENT DOCUMENTS

| | | | |
|---|---|---|---|
| 2,845,969 | 8/1958 | DuQuesne | 157/1.24 X |
| 3,029,861 | 4/1962 | Gambardella | 157/1.22 |
| 3,037,549 | 6/1962 | Jacobson | 157/1.22 |
| 3,791,434 | 2/1974 | DuQuesne | 157/1.24 |
| 4,694,875 | 9/1987 | Goebel | 157/1.24 |
| 4,702,295 | 10/1987 | Ewald | 157/1.22 X |
| 4,784,203 | 11/1988 | Weiden | 157/1.24 |

Primary Examiner—James G. Smith
Attorney, Agent, or Firm—William A. Drucker

[57] ABSTRACT

The apparatus comprises a stand, a head with a central opening and fixed on the stand and on which the wheel to be fitted is placed, a movable disc for exerting pressure on the wheel and part of which is formed by a sleeve provided with an axial opening and which is adjusted in the opening of the head, a locking means under the head for drawing and gripping the sleeve and for locking the disc against the wheel, a rod mechanism and pedal on the stand for controlling the locking means, a movable pivot axle which is adjusted in the opening of the sleeve and can turn there, a second locking means mounted so that it can rotate on the disc and serving to fasten the pivot axle, a lever mounted on the pivot axle, at least one fitting roller mounted on the lever the rolling surface of which is provided with a groove which serves to roll the tire bead over the flange of the wheel rim, and a retaining means forming part of the pivot axle meant for holding the tire in position during fitting.

12 Claims, 3 Drawing Sheets

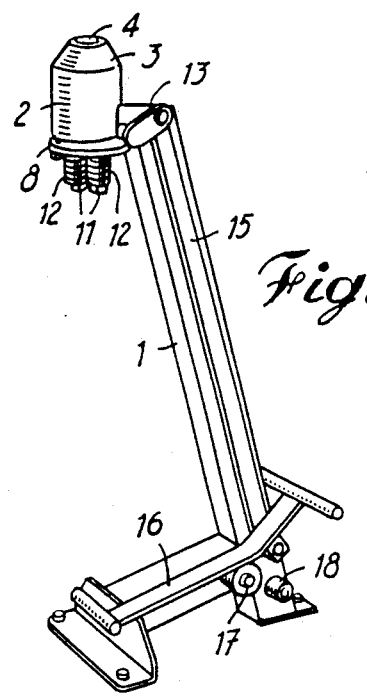
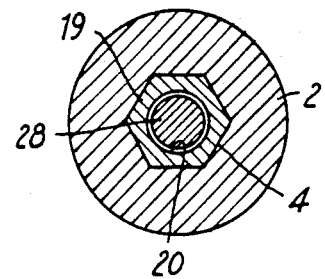
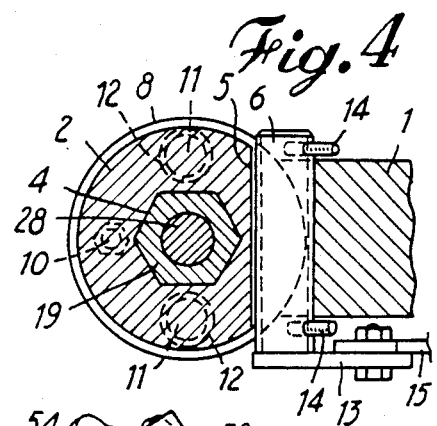
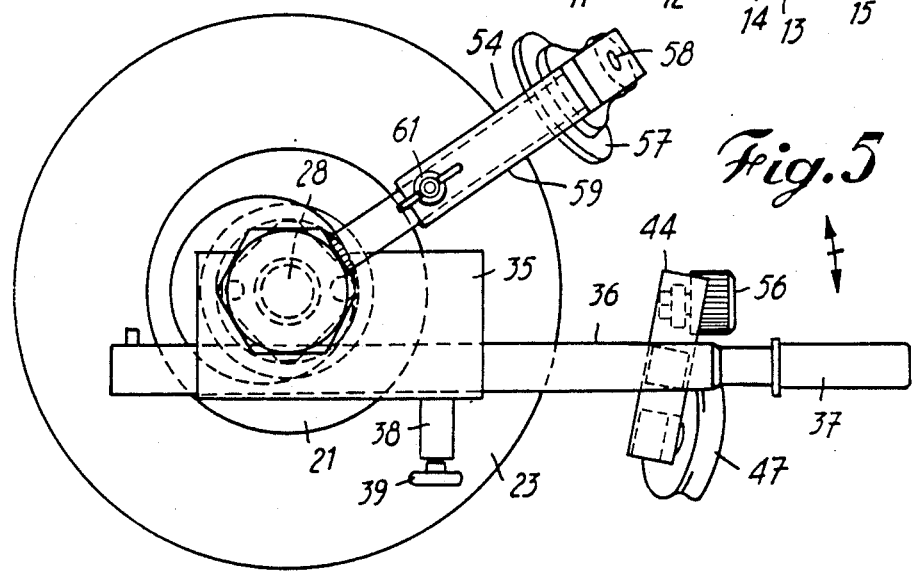

APPARATUS FOR FITTING TIRES ON THE WHEELS OF MOTOR VEHICLES

This invention is for an apparatus for fitting a tire on a motor vehicle wheel, in particular a type where the bead of the tire must rolled over the flange of the wheel rim.

An apparatus of this kind for the fitting of car tires is already known but is composed of various complicated and expensive parts, including a mechanism containing levers and springs and requiring numerous adjustments.

In order to remedy these drawbacks a simple and inexpensive apparatus is provided according to the invention. Moreover only limited manipulation is required for fitting a tire to a wheel and the tire cannot be nipped between the wheel rim and the fitting tool.

This apparatus in accordance with the invention consists primarily of a stand, a head with a central opening fixed on the stand and on which the wheel to be fitted is placed, a movable disc for exerting pressure on the wheel and which forms part of a sleeve provided with an axial opening and which is adjusted in the opening of the head, a locking means under the head for drawing and holding the sleeve and for locking the disc against the wheel, a rod mechanism and pedal on the stand for controlling the locking means, a movable pivot axle which is adjusted in the opening of the sleeve and can turn there, a second locking means mounted so that it can rotate on the disc and serving to fasten the pivot axle, a lever mounted on the pivot axle, at least one fitting roller mounted on the lever and the rolling surface of which is provided with a groove which serves to roll the tire bead over the flange of the wheel rim, and a means forming part of the pivot axle meant for holding the tire in position during fitting.

By way of example and without in any way being exhaustive, a more detailed description is given below of a selected embodiment of the apparatus in accordance with the invention. This description refers to the attached drawings, where:

FIG. 3 is transverse section along the line III—III in FIG. 1;

FIG. 4 is a transverse section along the line IV—IV in FIG. 1.

FIG. 5 is a plan view of the apparatus;

FIG. 6 is a perspective view of the stand of the apparatus;

Figure 1:
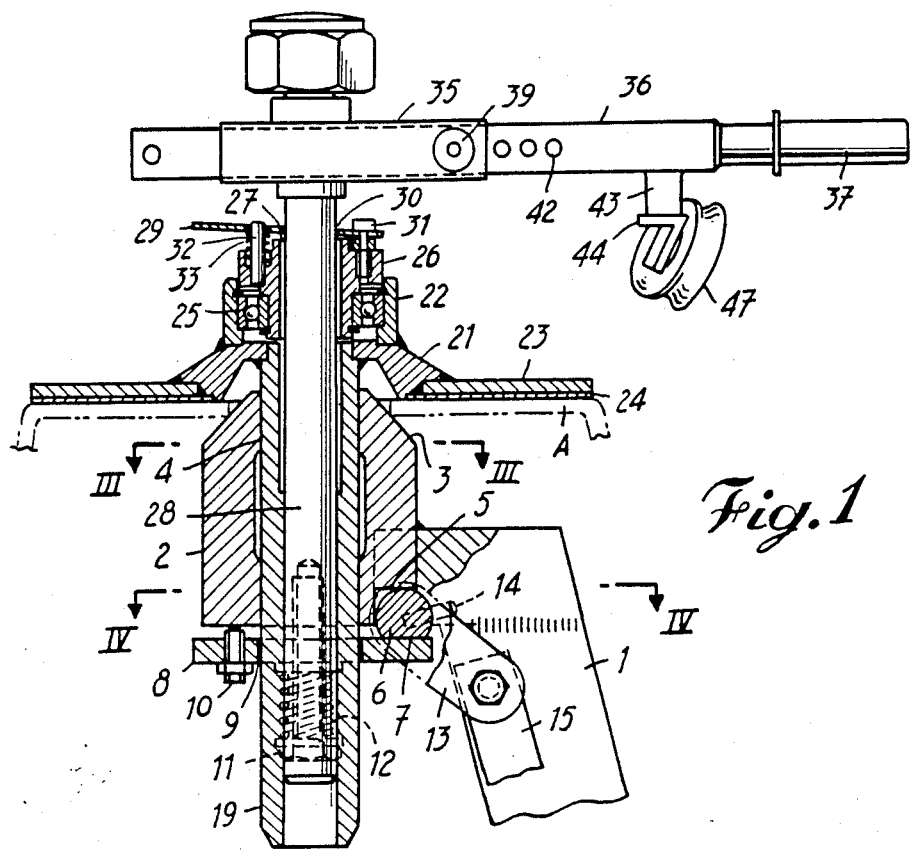
FIG. 1 shows a longitudinal section through the upper part of the apparatus.
Figure 2:
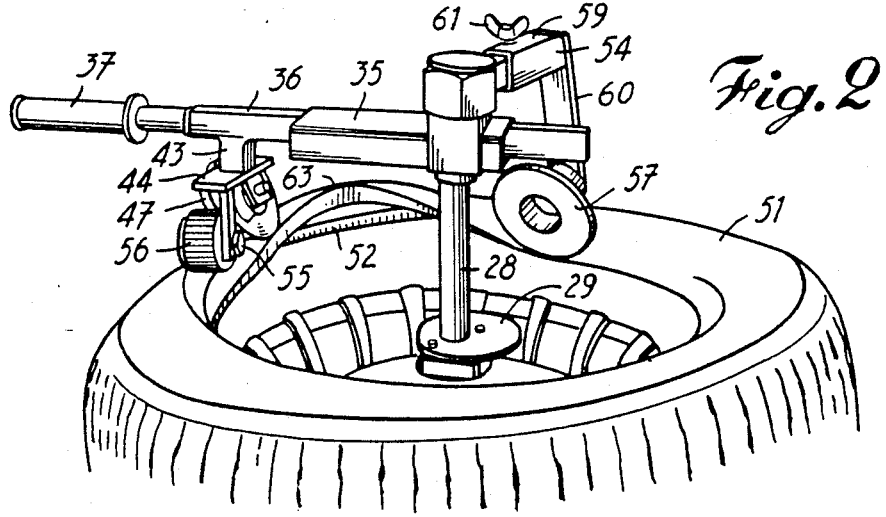
FIG. 2 shows a perspective view of the upper part of the apparatus.
Figure 7:
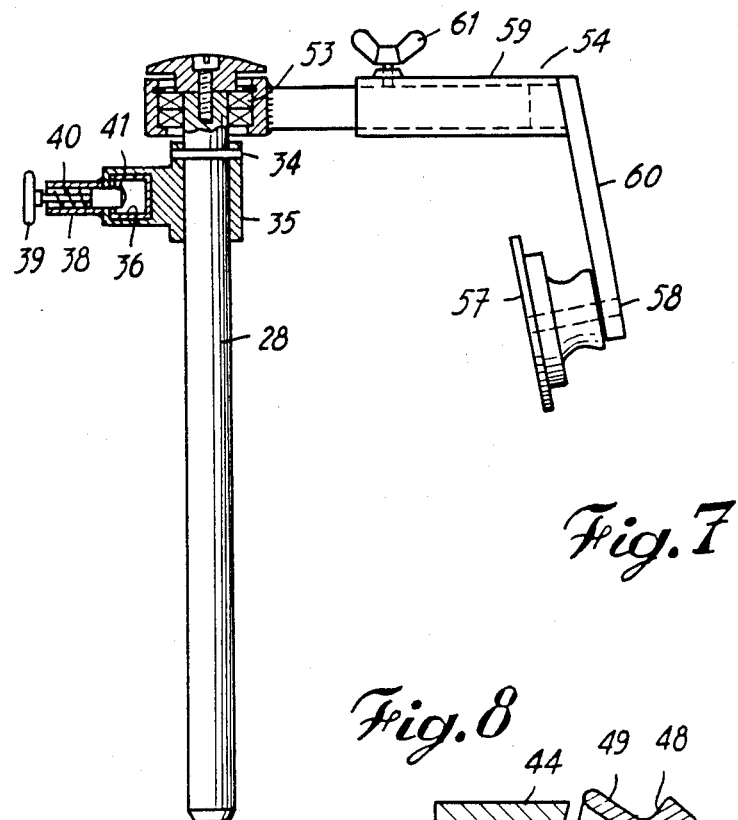
FIG. 7 is a longitudinal section of the lever assembly of the apparatus.
Figure 8:
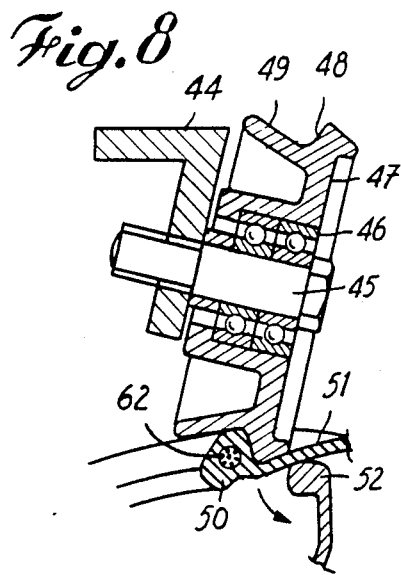
FIG. 8 is a longitudinal section of the pressure roller and part the tire to be fitted to the wheel rim.
Figure 9:
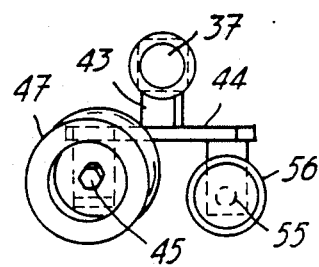
FIG. 9 is a front view of the fitting roller and the pressure roller.

In these figures it will be noted that the apparatus comprises a stand 1 which is provided at the top with a head 2 with a conical surface 3 which adjusts itself in the central hole of the wheel being fitted. This head is provided with an opening with a hexagonal section 4. At the bottom of the head 2 and in an angular recess 5 a cylindrical cam 6 is freely mounted which has a flat surface 7 resting on a locking plate 8 provided with a hole with a hexagonal section 9. This plate which is provided with a setting screw 10 is freely suspended around two bolts 11 screwed into the lower face of the head and is pressed on one side against the cam 6 and on the other side with the setting screw against the lower surface of the head 2 by means of two pressure springs 12 set out around the two bolts 11 and between the head of these bolts and the lower face of the plate 8. One end of the cam is provided with a connecting rod 13 and a stub 14 is fixed in each end of the cam and the stand is arranged between them in such a way that the cam cannot be moved axially in the recess 5. The connecting rod 13 is connected so that it can pivot to a rod 15 which is connected at the bottom to a double pedal 16 suspended around a fixed pivot 17 and of which the displacement is limited by a stop 18 fixed on the stand 1. In the opening 4 of the head and the hole 9 of the plate 8 a movable sleeve 19 is adjusted with a hexagonal section and provided with a cylindrical axial opening 20 and which forms part of the device for fixing a wheel A with a central hole of whatsoever diameter on the conical surface 3 of the head 2. This sleeve forms a whole with a conical cap 21, a collar 22 and a disc 23 provided with an elastic disc 24, which are placed on the wheel A for the purpose of fixing this wheel. When the pedal 16 is depressed the cam 6 pivots around its axle in the recess 5 by the intermediary of the rod 15 and the connecting rod 13, so that pressure is exerted on the locking plate 8, this pivots around the setting screw 10 and takes up an oblique position, as a result of which the sleeve is gripped, pulled downward and locked in the hole 9 of the locking plate 8. At the end of this motion the elastic disc 24 is pressed against the wheel A and this is fixed firmly on the conical surface 3 of the head 2. A square block 26 is mounted in the collar 22 in which a ball bearing 25 is inserted. This block is provided with a central opening 27 in which a movable cylindrical pivot axle 28 can slide freely which can also slide in the opening 20 of the sleeve 19, which axle part of the device for fitting the tire. A locking plate 29 provided with an opening 30 is fixed on the square block 26. This plate can pivot about a screw 31 screwed into the block 26. A guide pin 32 fixed in the block passes freely through the locking plate. Between this block 26 and the locking plate 29 there is a pressure spring 33 which pushes the plate in the oblique position, so that the pivot axle 28 passing through the opening 30 is connected in this position to the pivoting block 26. When the pivot axle 28 is inserted in the opening 27 of the block 26 and the opening 20 of the sleeve 19, the locking plate 29 takes up a horizontal position, as a result of which the pivot axle 28 can be moved towards the bottom, while when one attempts to withdraw the pivot axle from the block 26 and the sleeve 19, this plate 29 exercises firm pressure on the pivot axle. Consequently it is only possible to withdraw the pivot axle 28 when the locking plate 29 is pushed downward. The pivot axle 28 is fixed in a lever assembly 35 by means of a dowel 34 and in which a lever 36 provided with a handgrip 37 can slide. A ring 38 is welded on the lever assembly in which there is a retaining catch 39 provided with a pressure spring 40 and a pin 41. This pin operates in conjunction with one of the holes 42 provided in the lever 36 and by means of which it is possible to lock the lever in a position chosen according to the diameter of the wheel being fitted. The lever 36 is provided with an arm 43 at the end of which there is a support to which is fixed a spindle 45 around which is installed a fitting roller 47 by the intermediary of two ball bearings 46. This fitting wheel is used for fitting the tire on a wheel A to be installed on the apparatus. This fitting roller is installed obliquely to the vertical plane and inclined towards the centre of the wheel and installed obliquely in the horizontal plane and in the direction the roller rolls in and inclined towards the outside of the wheel, so that it can grip and guide the bead of the tire during its fitting on to the wheel. The rolling surface of this roller has a groove with two annular surfaces 48–49 which form an angle to one another. The annular surface 48 serves to push the bead 50 of the tire 51 progressively in the direction of the centre of the tire and the other annular surface 49 to push the bead 50 of the tire downwards and over the flange of the wheel rim 52, without the tire being nipped between the wheel rim and the roller. The support 44 is also provided with a spindle 55 around which is mounted a pressure roller 56 the circumference of which is milled. This roller 56 is provided with a means (not shown) so that it can be turned only in one direction. In order to hold the tire during fitting, a retaining means 54 provided with ball bearings 53 is mounted on the upper edge of the pivot axle 28. This retaining means comprises a retaining roller 57 mounted on a fixed spindle 58 fixed on a horizontal arm 59 and arranged obliquely and inclined towards the outside of the wheel. This roller serves to exert pressure on the cheek of the tire 51 and to keep the tire still during the course of fitting. The arms 59 comprise an oblique part 60 which can slide with respect to arm 59. A locking device 61 forming part of the retaining means 54 makes it possible to lock the retaining roller 57 in a desired position, depending on the diameter of the wheel being fitted.

When a wheel A is fixed on the head 2 of the apparatus as described above and the pivot axle 28 is inserted and locked in the block 26 and the sleeve 19, the fitting roller 47, the pressure roller 56 and the retaining roller 57 rest on the tire 51. After this, the retaining roller 57 is separated from the fitting roller 47 and the pressure roller 56 with a circular motion, after which the retaining roller 57 restrains the tire. By then pulling on lever 36 with a circular motion, the fitting roller 47 grips the bead 50 of the tire and pushes part of it over the flange 52 of the wheel rim, while the pressure roller 56 rolls freely on the tire. One then pushes the lever 36 in the opposite direction. The retaining roller 57 holds the tire in position during this movement, while the pressure roller 56 which does not turn about its axis 55 in the direction of the motion of the lever, pushes with its milled rolling surface on the tire, so that this is compressed, the steel wire circlet in the bead 50 of the tire is then pushed towards the part of the tire bead already fitted in the wheel. As a result the hump 63 which distorts the circumference of the tire bead during fitting is kept as small as possible. By successively applying a stretching and pressing force on the tire 36 in a circular motion, the bead 50 of the tire is progressively pushed over the flange 52 of the wheel rim, by the fitting roller 47.

The cooperation of the fitting roller 47 with the pressure roller 56 and the retaining roller 57 ensures that the hump 63 formed in the tire beading during fitting, is kept to a minimum, that the distortion of steel wire circlet 62 in the bead of the tire is relatively small and that in this way the permanent distortion of this wire after fitting the tire is prevented. The result is that the tire can be well fitted and that there is no play between the circular part of the tire bead and the circular inner part of the wheel. Finally the fitting of the tire on the wheel is considerably simplified by the elements described above. It goes without saying that the shape, dimensions and the arrangement of the elements described above relative to one another may be varied while nevertheless continuing to fall within the scope of this invention and even that certain elements may be replaced by others which serve the same purpose.

I claim:

1. Apparatus for fitting the tires of motor vehicle wheels, comprising a stand, a head with a central opening and fixed on the stand and on which the wheel to be fitted is placed, a movable disc for exerting pressure on the wheel and part of which is formed by a sleeve provided with an axial opening and which is adjusted in the opening of the head, a locking means under the head for drawing and gripping the sleeve and for locking the disc against the wheel, a rod mechanism and pedal on the stand for controlling the locking means, a movable pivot axle which is adjusted in the opening of the sleeve and can turn there, a second locking means mounted so that it can rotate on the disc and serving to fasten the pivot axle, a lever mounted on the pivot axle, at least one fitting roller mounted on the lever the rolling surface of which is provided with a groove which serves to roll the tire bead over the flange of the wheel rim, and a retaining means forming part of the pivot axle meant for holding the tire in position during fitting.

2. Apparatus as defined in claim 1, in which the lever is provided with a support bearing the fitting roller and a pressure roller which serves to push the bead of the tire progressively towards the inner part of the wheel and to push the steel wire circlet contained in this bead, in order to limit the distortion of this wire during the fitting of the tire.

3. Apparatus as defined in claim 1, in which the fitting roller is mounted obliquely in the vertical plane and inclined towards the centre of the wheel and mounted in the horizontal plane and in the direction of movement obliquely and inclined towards the outside of the wheel, where the rolling surface of the roller has a groove comprising two annular surfaces forming an angle to one another and where one annular surface serves to push the bead of the tire progressively in the direction of the centre of the wheel and the other annular surface serves to push the tire bead downwards and over the flange of the wheel rim.

4. Apparatus as defined in claim 2, in which the pressure roller is provided with a means which allows the roller to turn only in one direction and where the circumference of this roller is milled.

5. Apparatus as defined in claim 1, in which the upper part of the head of the apparatus has a conical surface which can accept a wheel with a central hole of any diameter whatsoever.

6. Apparatus as defined in claim 1, in which the pivot axle is fixed in a lever assembly in which the lever is mounted so that it can be moved and where the lever assembly is provided with a means for fixing the lever in various positions in the lever assembly.

7. Apparatus as defined in claim 6, in which the fastening means of the lever in the lever assembly, consists of a retaining catch provided with a pressure spring and whereof the free end operates in conjunction with one of the openings provided in the lever.

8. Apparatus as defined in claim 1, in which the means of retaining the tire during fitting is composed of a horizontal arm one end of which is mounted so that it can pivot around the pivot axle and the other end is extended by an oblique part which is inclined towards the outside of the wheel, on which part is mounted a retaining roller which is intended for holding the tire still during fitting.

9. Apparatus as defined in claim 1, in which the sleeve of the disc has a hexagonal section and the locking means consists of a locking plate provided with a hexagonal opening through which the sleeve passes, a setting screw screwed into the locking plate and resting against the lower surface of the head of the apparatus, two guide bolts screwed into the lower surface of the head of the apparatus and on which the plate can move, a pressure spring between each bolt and the locking plate, a cam between the head of the apparatus and the plate for guiding the plate into an oblique position with respect to the sleeve and for gripping and drawing the sleeve downwards and pressing the disc and a rod mechanism for controlling the cam.

10. Apparatus as defined in claim 1, in which the opening in the head of the apparatus has a hexagonal section in which the sleeve adjusts itself and where the disc for fastening the wheel is provided with a collar in which a block is mounted so that it can rotate onto which is fixed the locking means.

11. Apparatus as defined in claim 10, in which the locking means for fastening the pivot axle consists of a locking plate, a hinge screw for the locking plate, a guide pin fixed in the block and passing through the plate and a pressure spring arranged between the block and the locking plate to push this plate into an oblique position.

12. Apparatus as defined in claim 9, in which the rod mechanism for controlling the cam is swivel fitted to a double pedal swivel fitted to the stand.

* * * * *